US011528586B2

(12) United States Patent
Tamanaha et al.

(10) Patent No.: US 11,528,586 B2
(45) Date of Patent: Dec. 13, 2022

(54) COMMUNICATION SYSTEM, COMMUNICATION METHOD, AND STORAGE MEDIUM

(71) Applicant: HONDA MOTOR CO., LTD., Tokyo (JP)

(72) Inventors: Ryusuke Tamanaha, Wako (JP); Masaru Otaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 563 days.

(21) Appl. No.: 16/656,597

(22) Filed: Oct. 18, 2019

(65) Prior Publication Data

US 2020/0137537 A1 Apr. 30, 2020

(30) Foreign Application Priority Data

Oct. 29, 2018 (JP) .............................. JP2018-203209

(51) Int. Cl.
*H04W 4/40* (2018.01)
*G01S 5/00* (2006.01)
(Continued)

(52) U.S. Cl.
CPC .............. *H04W 4/40* (2018.02); *G01S 5/0018* (2013.01); *G01S 5/0221* (2013.01); *G07C 5/008* (2013.01);
(Continued)

(58) Field of Classification Search
CPC ......... H04W 56/0005; H04W 56/0015; H04W 56/0045; H04W 64/00; H04W 64/006; H04W 84/042; H04W 88/14
(Continued)

(56) References Cited

U.S. PATENT DOCUMENTS 5,565,870 A * 10/1996 Fukuhara .............. G01S 7/2926
342/72
2011/0263241 A1* 10/2011 Duarte .............. H04M 1/72454
455/422.1
(Continued)

FOREIGN PATENT DOCUMENTS

CN     1717592     1/2006
CN     1969464     5/2007
(Continued)

OTHER PUBLICATIONS

Japanese Office Action for Japanese Patent Application No. 2018-203209 dated Jul. 20, 2021.
(Continued)

*Primary Examiner* — Joseph Arevalo
(74) *Attorney, Agent, or Firm* — Amin, Turocy & Watson, LLP (57) ABSTRACT

A communication system is a communication system provided in a mobile body and including an acquirer configured to acquire a destination of the mobile body and a position of the mobile body, and a communicator configured to communicate with a communication device outside the mobile body using an antenna, in which the communicator is configured to set a reception sensitivity of the antenna when the position of the mobile body approaches to within a predetermined distance from the destination of the mobile body to be higher than a reception sensitivity of the antenna before the position of the mobile body approaches to within the predetermined distance.

8 Claims, 6 Drawing Sheets

(51) Int. Cl.
  *G07C 5/00* (2006.01)
  *H01Q 1/32* (2006.01)
  *G01S 5/02* (2010.01)

(52) U.S. Cl.
  CPC ......... *H01Q 1/3216* (2013.01); *H01Q 1/3233* (2013.01)

(58) Field of Classification Search
  USPC .......................................................... 701/408
  See application file for complete search history.

(56) References Cited

U.S. PATENT DOCUMENTS

| | | | | |
|---|---|---|---|---|
| 2015/0332532 | A1* | 11/2015 | Lee | G07C 9/00658 340/5.72 |
| 2016/0081055 | A1 | 3/2016 | Chika et al. | |
| 2016/0198299 | A1 | 7/2016 | Dobyns | |
| 2019/0116605 | A1* | 4/2019 | Luo | H04B 7/024 |
| 2020/0059879 | A1* | 2/2020 | Nam | H04W 56/0005 |
| 2020/0322976 | A1* | 10/2020 | Islam | H04W 72/1273 |
| 2021/0068092 | A1* | 3/2021 | Abedini | H04W 56/0075 |
| 2021/0250898 | A1* | 8/2021 | Abedini | H04W 68/005 |
| 2021/0310833 | A1* | 10/2021 | Doi | G01D 5/24 |
| 2021/0345324 | A1* | 11/2021 | Liu | H04W 72/042 |
| 2022/0070809 | A1* | 3/2022 | Song | H04W 72/0446 |

FOREIGN PATENT DOCUMENTS

| | | |
|---|---|---|
| CN | 201919027 | 8/2011 |
| CN | 106364451 | 2/2017 |
| CN | 108009452 | 5/2018 |
| JP | 2005-142658 | 6/2005 |
| JP | 2008-032569 | 2/2008 |
| JP | 2010-055398 | 3/2010 |
| JP | 2016-171468 | 9/2016 |
| WO | 2004/048994 | 6/2004 |

OTHER PUBLICATIONS

Chinese Office Action for Chinese Patent Application No. 201911014733.X dated Oct. 28, 2020.
Chinese Office Action for Chinese Patent Application No. 201911014733.X dated Apr. 29, 2021.

* cited by examiner

COMMUNICATION SYSTEM, COMMUNICATION METHOD, AND STORAGE MEDIUM

CROSS-REFERENCE TO RELATED APPLICATION

Priority is claimed on Japanese Patent Application No. 2018-203209, filed Oct. 29, 2018, the content of which is incorporated herein by reference

BACKGROUND

Field of the Invention

The present invention relates to a communication system, a communication method, and a storage medium.

Description of Related Art

In the related art, a technology for changing the directivity of an antenna according to a traveling angle of a vehicle or a position of the vehicle relative to a position of a base station outside the vehicle in information communication in which radio waves are transmitted and received between devices mounted in the vehicle and the base station is known (for example, Japanese Unexamined Patent Application, First Publication No. 2005-142658).

SUMMARY

Incidentally, in recent years, research on information communication using a fifth generation (5G) communication system in a device mounted in a vehicle has been performed. The device mounted in the vehicle may communicate with other devices, in addition to a base station in the fifth generation communication system. However, in the related art, although communication quality can be improved by controlling an antenna on the basis of a relationship between the vehicle and the base station, it may be difficult to improve communication quality between the vehicle and other devices.

An aspect of the present invention has been made in view of such circumstances, and an object of the present invention is to provide a communication system, a communication method, and a storage medium that can improve communication quality between a vehicle and another device.

The communication system, the communication method, and the storage medium according to the present invention adopt the following configurations.

A communication system according to an aspect of the present invention is a communication system provided in a mobile body and including an acquirer configured to acquire a destination of the mobile body and a position of the mobile body, and a communicator configured to communicate with a communication device outside the mobile body using an antenna, wherein the communicator is configured to set a reception sensitivity of the antenna when the position of the mobile body approaches to within a predetermined distance from the destination of the mobile body to be higher than a reception sensitivity of the antenna before the position of the mobile body approaches to within the predetermined distance.

In the above aspect (1), the communicator is configured to increase the reception sensitivity of the antenna as the position of the mobile body approaches the destination.

In the above aspects (1), the communicator is configured to increase the reception sensitivity of the antenna as the position of the mobile body approaches the destination before the position of the mobile body approaches to within the predetermined distance from the destination.

In the above aspects (1), the communicator decreases the directivity of the antenna or is configured to set the antenna to be nondirectional when the distance between the position of the mobile body and the destination is within a predetermined distance.

In the above aspect (4), the communicator is configured to increase the directivity of the antenna in a direction of the destination when the distance between the position of the mobile body and the destination exceeds the predetermined distance.

In the above aspects (1), the communication system includes wherein the communicator is configured to not change the reception sensitivity of the antenna when the destination is not acquired by the acquirer.

A communication method according to an aspect of the invention includes acquiring, by a computer provided in a mobile body, a destination of the mobile body and a position of the mobile body; communicating, by the computer provided in a mobile body, with a communication device outside the mobile body using an antenna; and setting, by the computer provided in a mobile body, a reception sensitivity of the antenna when the position of the mobile body approaches to within a predetermined distance from the destination of the mobile body to be higher than a reception sensitivity of the antenna before the position of the mobile body approaches to within the predetermined distance.

A storage medium according to an aspect of the invention is a storage medium storing a program causing a computer provided in a mobile body to: acquire a destination of the mobile body and a position of the mobile body; communicate with a communication device outside the mobile body using an antenna; and set a reception sensitivity of the antenna when the position of the mobile body approaches to within a predetermined distance from the destination of the mobile body to be higher than a reception sensitivity of the antenna before the position of the mobile body approaches to within the predetermined distance.

According to the above aspects (1) to (8), it is possible to improve communication quality between the vehicle and another device.

DESCRIPTION OF EMBODIMENTS

Hereinafter, an embodiment of a communication system, a communication method, and a storage medium of the present invention will be described with reference to the drawings.

<Embodiment>

Figure 1:
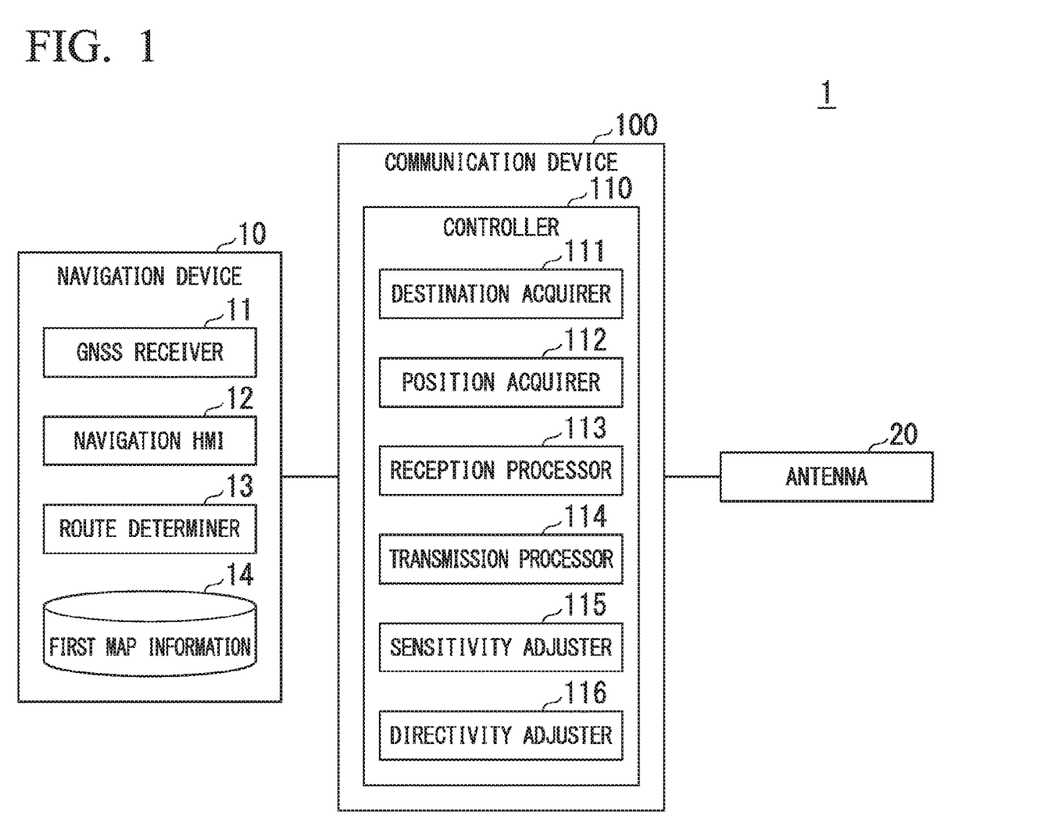
FIG. 1 is a diagram showing an example of a configuration of a communication system 1 according to an embodiment.

FIG. 1 is a diagram showing an example of a configuration of a communication system 1 according to the embodiment. The communication system 1 is a device that is mounted in a vehicle and performs communication between other devices mounted in the vehicle (hereinafter, in-vehicle devices) and devices outside the vehicle (hereinafter, external devices). The vehicle in which the communication system 1 is mounted (hereinafter, the host vehicle M) is, for example, a vehicle such as a two-wheeled vehicle, a three-wheeled vehicle, or a four-wheeled vehicle. The communication system 1 includes a navigation device 10, an antenna 20, and a communication device 100.

[Navigation Device 10]

The navigation device 10 includes, for example, a global navigation satellite system (GNSS) receiver 11, a navigation human machine interface (HMI) 12, and a route determiner 13. The navigation device 10 holds first map information 14 in a storage device such as a hard disk drive (HDD) or a flash memory. The GNSS receiver 11 specifies a position of the host vehicle M on the basis of a signal received from a GNSS satellite. The navigation HMI 12 includes a display device, a speaker, a touch panel, keys, and the like. The route determiner 13, for example, determines a route (hereinafter, an on-map route) from the position of the host vehicle M (or any input position) specified by the GNSS receiver 11 to a destination input by the occupant using the navigation HMI 12 by referring to the first map information 14. The first map information 14 is, for example, information in which a road shape is represented by links indicating roads and nodes connected by the links. The navigation device 10 may perform route guidance using the navigation HMI 12 on the basis of the on-map route. The navigation device 10 may be realized, for example, by a function of a terminal device such as a smartphone or a tablet terminal possessed by the occupant. The navigation device 10 may transmit a current position and a destination to a navigation server via the communication device 100 and acquire the same route as the on-map route from the navigation server.

[Antenna 20]

The antenna 20 includes an oscillator, an overemphasis circuit, an amplifier, and the like, and transmits or receives radio waves. A reception sensitivity and directivity of the antenna 20 are controlled by the communication device 100. The antenna 20 is, for example, a massive multiple input and multiple output (MIMO) antenna, and has a function of performing communication according to a communication scheme using a fifth generation (5G) communication system.

[Communication Device 100]

The communication device 100 communicates with an external device using a cellular network, a Wi-Fi network, Bluetooth (registered trademark), dedicated short range communication (DSRC), or the like or communicates with various server devices via a wireless base station. Hereinafter, a case in which the communication device 100 performs communication using a cellular network using a fifth generation communication system will be described. The communication device 100 includes a controller 110. The controller 110, for example, includes a destination acquirer 111, a position acquirer 112, a reception processor 113, a transmission processor 114, a sensitivity adjuster 115, and a directivity adjuster 116 by a hardware processor such as a central processing unit (CPU) executing a program (software) stored in a storage (not shown).

The destination acquirer 111 acquires information indicating a destination acquired by the navigation device 10. The position acquirer 112 acquires information indicating a current position of the host vehicle M acquired by the GNSS receiver 11.

The reception processor 113 performs a process related to communication (that is, reception) from the external device to the in-vehicle device. The reception processor 113, for example, outputs information acquired by demodulating and combining the radio waves received by the antenna 20 to the in-vehicle device that is a reception target.

The transmission processor 114 performs a process related to communication (that is, transmission) from the in-vehicle device to the external device. For example, the transmission processor 114 encodes and modulates information transmitted from the in-vehicle device to the external device, and causes the antenna 20 to transmit the resultant information.

The sensitivity adjuster 115 adjusts reception sensitivity and transmission sensitivity of the antenna 20 on the basis of the destination of the host vehicle M. Details of a process of the sensitivity adjuster 115 will be described below. The directivity adjuster 116 adjusts the directivity of the antenna 20 on the basis of the destination of the host vehicle M. Details of the process of the directivity adjuster 116 will be described below.

[Communication Using Fifth Generation Communication System]

The communication using the fifth generation communication system will be described prior to description of processes of the sensitivity adjuster 115 and the directivity adjuster 116. In recent years, research on Vehicle to Everything (V2X) that enables the host vehicle M (the in-vehicle device) and various things to communicate with each other by using a fifth generation communication system has proceeded. Examples of V2X include vehicle-to-vehicle communication (hereinafter referred to as V2V communication (Vehicle to Vehicle)), vehicle-to-infrastructure communication (hereinafter referred to as V2I communication (Vehicle to Infrastructure)), vehicle-to-network communication (hereinafter referred to as V2N communication (Vehicle to Network)), and vehicle-to-pedestrian communication (hereinafter referred to as V2P communication (Vehicle to Pedestrian)).

In this case, the external device is, for example, a terminal device such as a smartphone possessed by a pedestrian, a portable personal computer such as a tablet computer (a tablet PC) possessed by the pedestrian, or a navigation device included in another vehicle. The in-vehicle device is, for example, a terminal device such as a smartphone or a tablet terminal held by an occupant of the host vehicle M, or the navigation device 10. Hereinafter, a case in which the in-vehicle device is the navigation device 10 will be described.

For example, when there is a popular spot other than the destination around the destination, the occupant of the host vehicle M may want to stop at the spot. In this case, it is preferable for the in-vehicle device to present the presence of the popular spot to the occupant of the host vehicle M on the basis of information received from a pedestrian or vehicle present at the popular spot around the destination through V2V communication or V2P communication.

When the destination of the host vehicle M is not particularly determined, it is preferable for the communication system 1 to transmit information on the current position of the host vehicle M as information that an external device of the nearby pedestrian or vehicle uses for estimation of a mixed state (in other words, the presence of the popular spot) to the nearby pedestrian or vehicle through V2V communication or V2P communication.

Hereinafter, the processes of the sensitivity adjuster 115 and the directivity adjuster 116 when the communication system 1 receives the information from the pedestrian or vehicle around the popular spot will first be described, and then, the processes of the sensitivity adjuster 115 and the directivity adjuster 116 when the communication system 1 transmits the information on the current position of the host vehicle M to another person present around the host vehicle M will be described.

[Reception Process When Host Vehicle is Distant From Destination]

Figure 2:
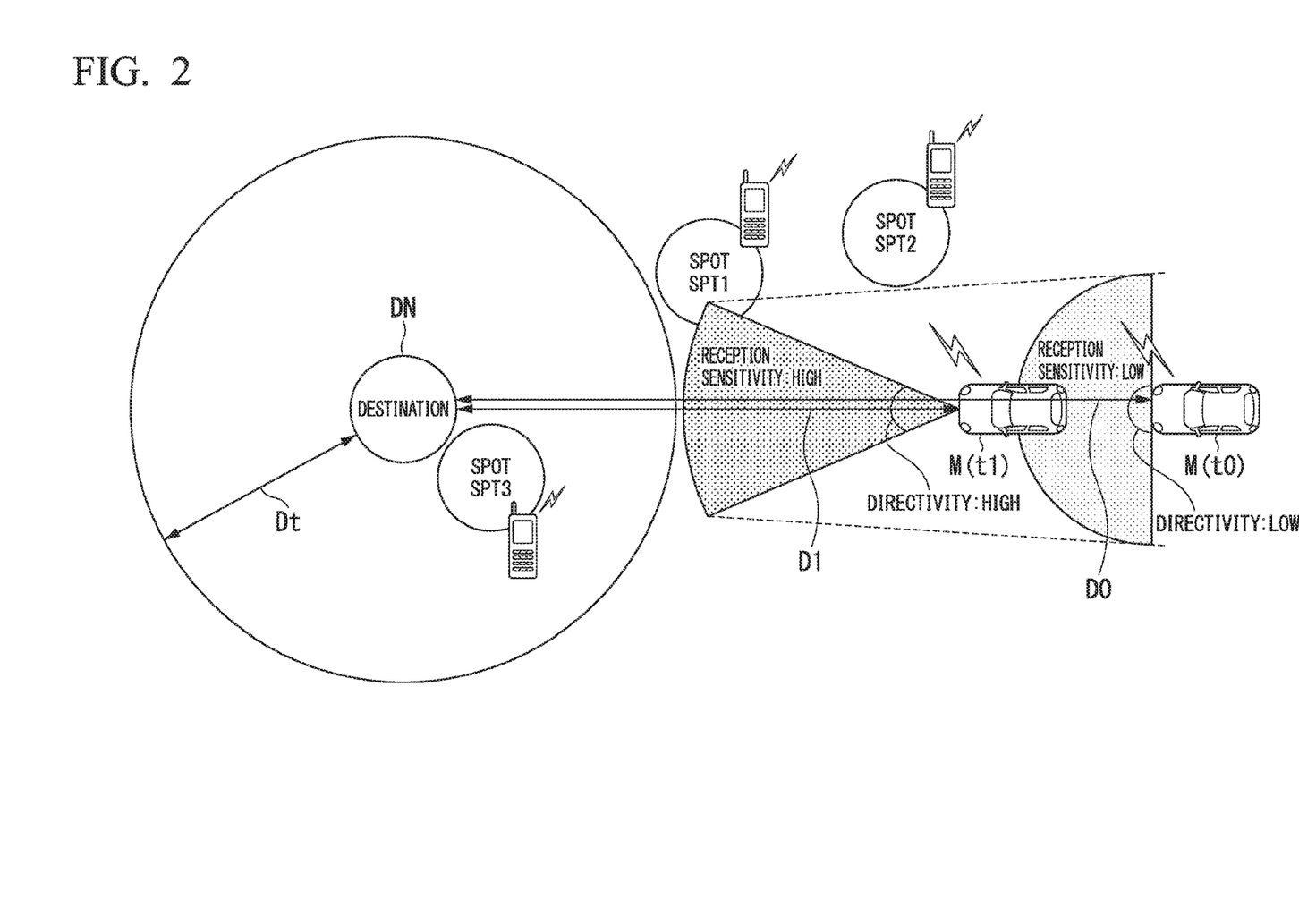
FIG. 2 is a diagram conceptually showing a process of a sensitivity adjuster 115.

Hereinafter, processes of the sensitivity adjuster 115 and the directivity adjuster 116 when the destination of the host vehicle M is determined and the host vehicle M is present at a place distant from the destination will be described. FIG. 2 is a diagram conceptually showing the process of the sensitivity adjuster 115. In FIG. 2, a destination DN is determined for the host vehicle M according to an operation of the navigation device 10 by the occupant. Hereinafter, a case in which there are popular spots SPT1 to SPT3 around the destination DN will be described.

The sensitivity adjuster 115 adjusts the reception sensitivity of the antenna 20 on the basis of information indicating the destination DN acquired by the destination acquirer 111 and information indicating the current position of the host vehicle M acquired by the position acquirer 112. For example, when a distance from the current position of the host vehicle M to the destination DN exceeds a predetermined distance Dt (that is, when the destination DN is distant from the current position), the sensitivity adjuster 115 increases the reception sensitivity of the antenna 20 when the current position of the host vehicle M becomes closer to the destination DN. In FIG. 2, the sensitivity adjuster 115 calculates a distance D0 from the destination DN to the host vehicle M on the basis of the current position acquired at a certain time (t0) and the destination DN, for example. The sensitivity adjuster 115 calculates a distance D1 from the destination DN to the host vehicle M on the basis of the current position acquired at a time (t1) after a predetermined time has elapsed from the certain time (t0) and the destination DN. The sensitivity adjuster 115 increases the reception sensitivity of the antenna 20 since the distance D1 between the distance D0 and the distance D1 is a shorter distance (that is, the host vehicle M is approaching the destination DN).

The directivity adjuster 116 adjusts the directivity of the antenna 20 on the basis of the information indicating the destination DN acquired by the destination acquirer 111 and the information indicating the current position of the host vehicle M acquired by the position acquirer 112. For example, when the distance from the current position of the host vehicle M to the destination DN exceeds the predetermined distance Dt (that is, when the destination DN is distant from the current position), the directivity adjuster 116 increases the directivity of the antenna 20 in the destination direction as the current position of the host vehicle M approaches the destination DN. In FIG. 2, the directivity adjuster 116 calculates a distance D0 from the destination DN to the host vehicle M on the basis of the current position acquired at a certain time (t0) and the destination DN, for example. The directivity adjuster 116 calculates the distance D1 from the destination DN to the host vehicle M on the basis of the current position acquired at the time (t1) and the destination DN. The directivity adjuster 116 increases the directivity of the antenna 20 in the destination direction since the distance D1 between the distance D0 and the distance D1 is a shorter distance (that is, the host vehicle M is approaching the destination DN). Since a positional relationship between the current position and the destination DN changes according to traveling of the host vehicle M, the directivity adjuster 116 acquires the current position and the destination DN to specify (update) the destination direction always or at predetermined time intervals, and uses the destination direction to control the directivity of the antenna 20.

The sensitivity adjuster 115, for example, may adjust the reception sensitivity in a stepwise manner to increase the reception sensitivity at a timing when it has been determined that the host vehicle M is approaching the destination DN at the time (t1). The sensitivity adjuster 115 may increase the reception sensitivity linearly until a predetermined time elapses from the timing (that is, until a next timing when the distance from the destination DN to the host vehicle M is calculated). The directivity adjuster 116, for example, may adjust the directivity in a stepwise manner to increase the directivity at a timing when it has been determined that the host vehicle M is approaching the destination DN at the time (t1). The directivity adjuster 116 may increase the directivity linearly until a predetermined time elapses from the timing.

Accordingly, the sensitivity adjuster 115 can make it easier to receive information from an external device around the destination DN as the host vehicle M approaches the destination DN. For example, the sensitivity adjuster 115 can make it easier to receive information from an external device present at a spot SPT (a shown spot SPT1) even when the spot SPT is present at an end portion of a range in which information can be received by the antenna 20. The directivity adjuster 116 can make it easier to receive information from an external device present at a position closer to the destination DN as the host vehicle M approaches the destination DN. For example, even when a certain spot SPT is present around the destination DN, the directivity adjuster 116 can make it difficult for information from the spot SPT to be received (or prevent the information from being received) in a case in which the host vehicle M needs to move in a direction away from the destination DN in order to go to the spot SPT (for example, the shown spot SPT2).

The sensitivity adjuster 115 may be configured to immediately increase the directivity of the antenna 20 in a direction of the destination DN when the information indicating the destination DN is acquired by the destination acquirer 111.

[Process of Each Functional Unit]

The sensitivity adjuster 115 and the directivity adjuster 116 may not simultaneously change the sensitivity and the directivity to perform processes. For example, when the sensitivity adjuster 115 increases the reception sensitivity of the antenna 20 as the host vehicle M approaches the destination DN, the directivity adjuster 116 may not increase the directivity of the antenna 20. In this case, the communication device 100 may not include the directivity adjuster 116. For example, when the directivity adjuster 116 increases the directivity of the antenna 20 in the direction of the destination DN as the host vehicle M approaches the destination DN, the sensitivity adjuster 115 may not increase the reception sensitivity of the antenna 20. In this case, the communication device 100 may not include the sensitivity adjuster 115.

[Reception Process When Host Vehicle is Close to Destination]

Figure 3:
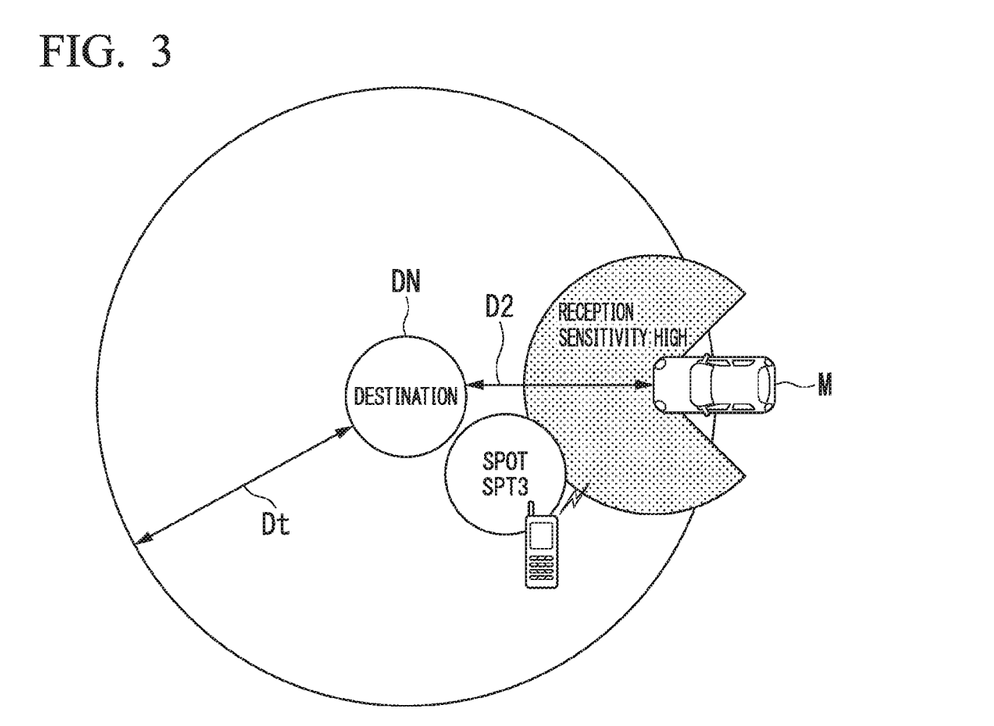
FIG. 3 is a diagram conceptually showing a process of a directivity adjuster 116.

Hereinafter, a process of the directivity adjuster 116 when the host vehicle M is present at a place close to the destination will be described. FIG. 3 is a diagram conceptually showing the process of the directivity adjuster 116. The directivity adjuster 116 adjusts the directivity of the antenna 20 on the basis of the information indicating the destination DN acquired by the destination acquirer 111 and the information indicating the current position of the host vehicle M acquired by the position acquirer 112. The directivity adjuster 116, for example, decreases the directivity of the antenna 20 when the distance between the current position of the host vehicle M and the destination DN (the shown distance D2) is within the predetermined distance Dt (that is, when the destination DN is close to the current position). Setting the antenna 20 to be nondirectional is included in decreasing the directivity of the antenna 20.

Accordingly, the directivity adjuster 116 can make it easier to receive information from an external device present around the destination DN (at the shown spots SPT2 to SPT3) when the host vehicle M is present at a position close to the destination DN.

For example, when the distance D2 is within the predetermined distance Dt (that is, when the destination DN is close to the current position), the sensitivity adjuster 115 may increase the reception sensitivity of the antenna 20 (for example, to a maximum). The sensitivity adjuster 115 may control the reception sensitivity of the antenna 20 so that the reception sensitivity of the antenna 20 is maximized before the distance D2 matches the predetermined distance Dt. Here, the relationship between a level of a predetermined reception sensitivity (hereinafter referred to as a predetermined reception sensitivity X1) controlled by the sensitivity adjuster 115 when the distance D2 is within the predetermined distance Dt and a level of a predetermined reception sensitivity (hereinafter referred to as a predetermined reception sensitivity X2) controlled by the sensitivity adjuster 115 when the distance D2 exceeds the predetermined distance Dt is predetermined reception sensitivity X1>predetermined reception sensitivity X2. When the distance D2 is within the predetermined distance Dt, the sensitivity adjuster 115 may immediately control the predetermined reception sensitivity X2 such that the reception sensitivity becomes the predetermined reception sensitivity X1, and may gradually control the predetermined reception sensitivity X2 such that the reception sensitivity becomes the reception sensitivity X1 after the distance D2 becomes within the predetermined distance Dt. The sensitivity adjuster 115 may increase the reception sensitivity as the host vehicle M approaches the destination DN from the current position.

The sensitivity adjuster 115 may increase the reception sensitivity as the host vehicle M approaches the destination DN when the distance D2 exceeds the predetermined distance Dt. In this case, when the distance D2 exceeds the predetermined distance Dt, the sensitivity adjuster 115 may not further increase the reception sensitivity in a case in which the reception sensitivity becomes the predetermined reception sensitivity X1. In this case, the predetermined reception sensitivity X1 is a maximum reception sensitivity when the distance D2 exceeds the predetermined distance Dt.

[Transmission Process When Destination is Determined: Sensitivity Adjuster 115]

Figure 4:
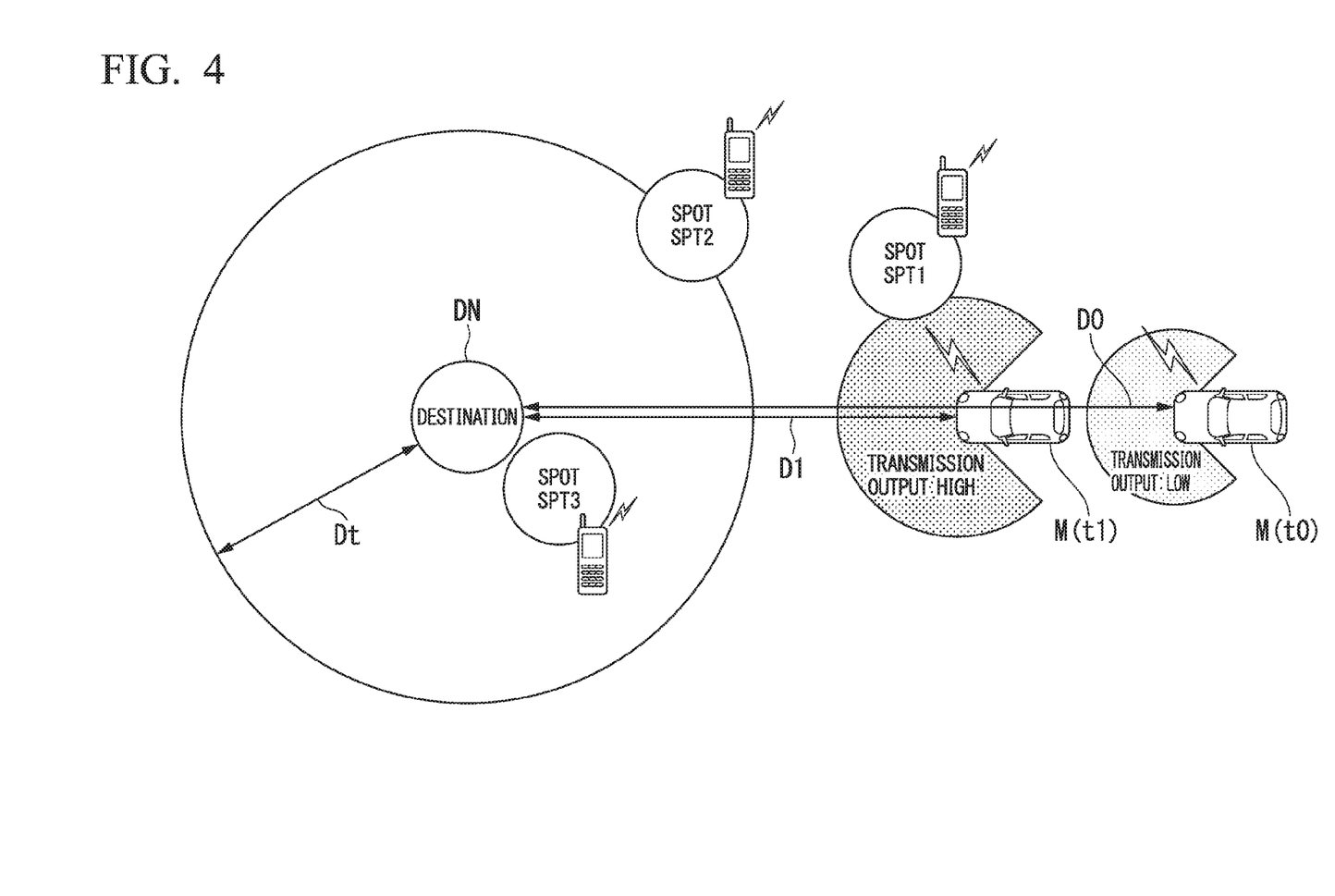
FIG. 4 is a diagram conceptually showing another process of the sensitivity adjuster 115.

Hereinafter, a process of the sensitivity adjuster 115 when the destination of the host vehicle M is determined will be described. FIG. 4 is a diagram conceptually showing another process of the sensitivity adjuster 115.

The sensitivity adjuster 115 adjusts an output when information is transmitted using the antenna 20 (hereinafter referred to as a transmission output) on the basis of the information indicating the destination DN acquired by the destination acquirer 111 and the information indicating the current position of the host vehicle M acquired by the position acquirer 112. The sensitivity adjuster 115, for example, increases the transmission output of the antenna 20 as the current position of the host vehicle M approaches the destination DN. In FIG. 4, the sensitivity adjuster 115 calculates a distance D0 from the destination DN to the host vehicle M on the basis of the current position acquired at a certain time (t0) and the destination DN, for example. The sensitivity adjuster 115 calculates the distance D1 from the destination DN to the host vehicle M on the basis of the current position acquired at the time (t1) and the destination DN. The sensitivity adjuster 115 increases the transmission output when the distance D1 out of the distance D0 and the distance D1 is a shorter distance (that is, the host vehicle M approaches the destination DN).

The sensitivity adjuster 115, for example, may adjust the transmission output in a stepwise manner to increase the transmission output at a timing when it has been determined that the host vehicle M is approaching the destination DN at the time (t1). The sensitivity adjuster 115 may increase the transmission output linearly until a predetermined time elapses from the timing (that is, until a next timing when the distance from the destination DN to the host vehicle M is calculated).

Accordingly, the sensitivity adjuster 115 can make it easy for information to be received by an external device around the destination DN as the host vehicle M approaches the destination DN. For example, the sensitivity adjuster 115 can make it easier for information to be received by an external device present at a spot SPT (a shown spot SPT1) even when the spot SPT is present at an end portion of a range in which information can be transmitted by the antenna 20. Accordingly, when the sensitivity adjuster 115 transmits a request for information on surroundings of the external device to the external device, the sensitivity adjuster 115 makes it easy for the in-vehicle device to obtain the information.

[Transmission Process When Destination is Not Determined: Sensitivity Adjuster 115]

When the destination DN of the host vehicle M is not determined, the sensitivity adjuster 115 may not change the transmission output of the antenna 20 according to the current position of the host vehicle M. For example, when the information indicating the destination DN of the host vehicle M has not been acquired by the destination acquirer 111, the sensitivity adjuster 115 keeps the transmission output of the antenna 20 high (for example, at a maximum). Accordingly, the sensitivity adjuster 115 makes it easier for the information on the current position of the host vehicle M to be used as the information that the external device of the nearby pedestrian or vehicle uses for estimation of the mixed state (in other words, the presence of a popular spot).

[Transmission Process When Destination is Not Determined: Directivity Adjuster 116]

When the destination DN of the host vehicle M is not determined, the directivity adjuster 116 may not change the directivity of the antenna 20 according to the current position of the host vehicle M. For example, when the information indicating the destination DN of the host vehicle M is not acquired by the destination acquirer 111, the directivity adjuster 116 keeps the directivity of the antenna 20 low. Accordingly, the directivity adjuster 116 makes it easier for the information on the current position of the host vehicle M to be used as information that the external device of the nearby pedestrian or vehicle uses for estimation of the mixed state (in other words, the presence of a popular spot).

[Reception Process Flow of Sensitivity Adjuster 115]

Figure 5:
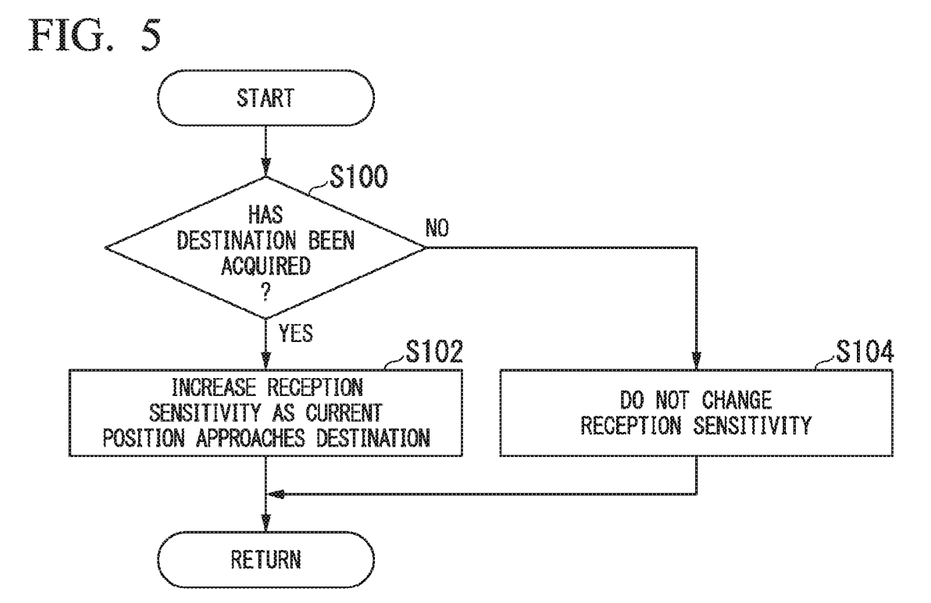
FIG. 5 is a flowchart showing an example of a series of flows related to a reception process of the sensitivity adjuster 115.

FIG. 5 is a flowchart showing an example of a series of flows related to the reception process of the sensitivity adjuster 115. First, the sensitivity adjuster 115 determines whether or not the information indicating the destination of the host vehicle M has been acquired by the destination acquirer 111 (step S100). When the destination of the host vehicle M has been acquired, the sensitivity adjuster 115 calculates the distance between the current position acquired by the position acquirer 112 and the destination, and increases the reception sensitivity of the antenna 20 as the host vehicle M (current position) approaches the destination (step S102). When the destination of the host vehicle M has not been acquired, the sensitivity adjuster 115 ends the process without changing the reception sensitivity (step S104).

[Transmission Process Flow of Sensitivity Adjuster 115]

Figure 6:
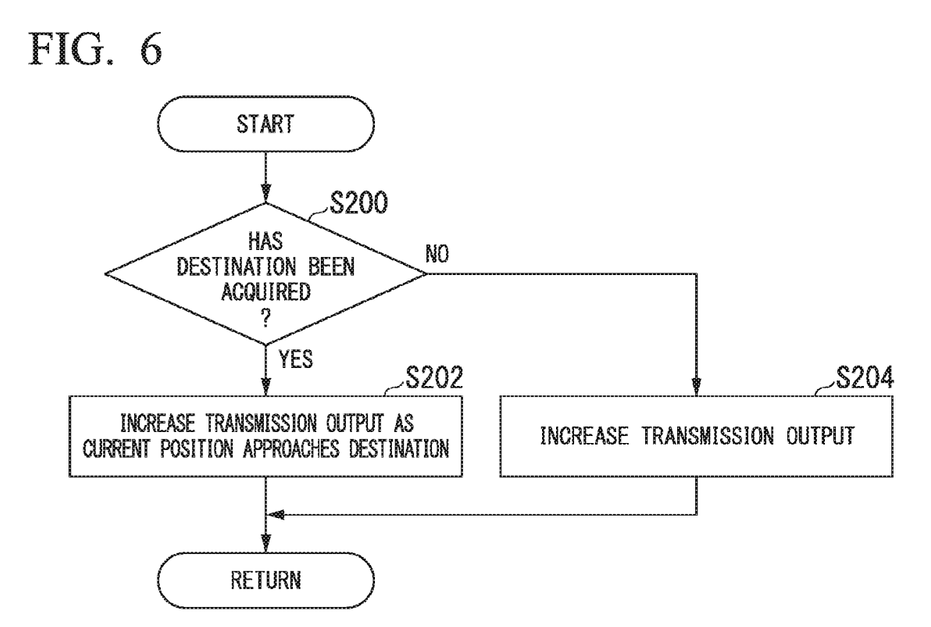
FIG. 6 is a flowchart showing an example of a series of flows related to a transmission process of the sensitivity adjuster 115.

FIG. 6 is a flowchart showing an example of a series of flows related to the transmission process of the sensitivity adjuster 115. First, the sensitivity adjuster 115 determines whether the information indicating the destination of the host vehicle M has been acquired by the destination acquirer 111 (step S200). When the destination of the host vehicle M has been acquired, the sensitivity adjuster 115 calculates the distance between the current position acquired by the position acquirer 112 and the destination, and increases the transmission output of the antenna 20 as the host vehicle M (current position) approaches the destination (step S202). When the destination of the host vehicle M has not been acquired, the sensitivity adjuster 115 increases (for example, maximizes) the transmission output of the antenna 20 and ends the process (step S204).

[Process Flow of Directivity Adjuster 116]

Figure 7:
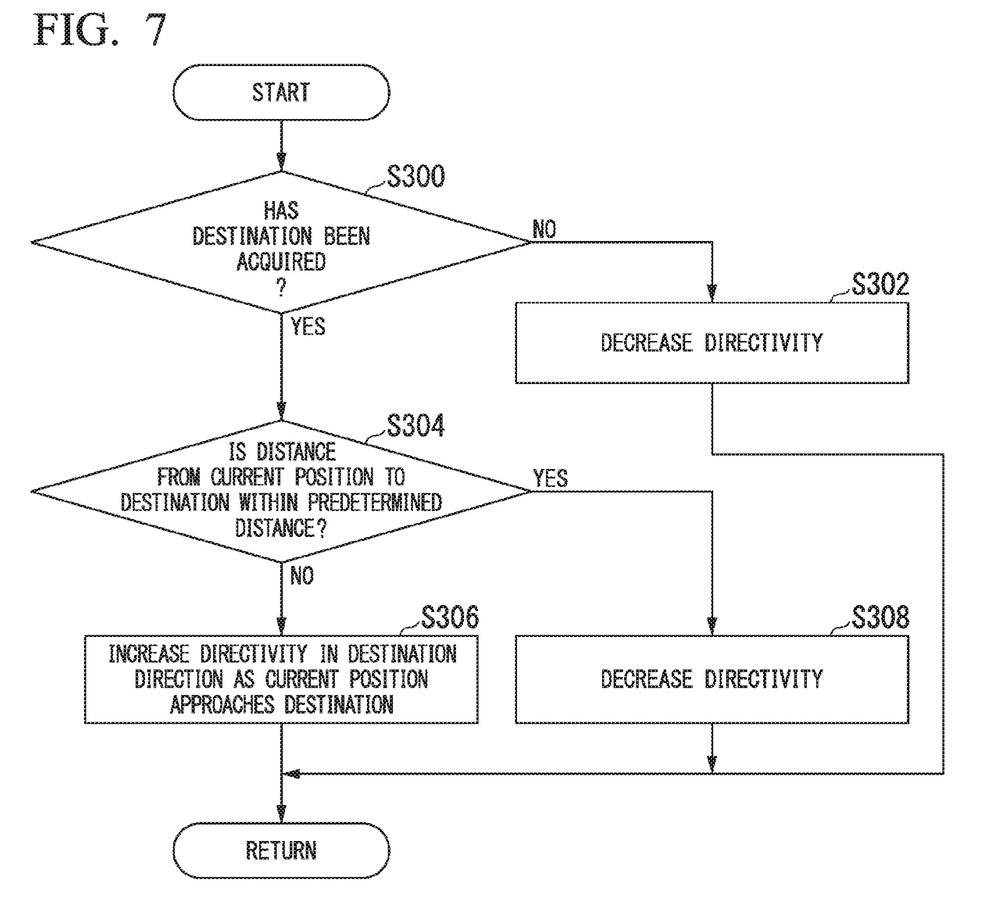
FIG. 7 is a flowchart showing an example of a series of flows related to the process of the directivity adjuster 116.

FIG. 7 is a flowchart showing an example of a series of flows related to a process of the directivity adjuster 116. First, the directivity adjuster 116 determines whether or not the information indicating the destination of the host vehicle M has been acquired by the GNSS receiver 11 (step S300). When the destination of the host vehicle M has not been acquired, the directivity adjuster 116 decreases the directivity of the antenna 20 and ends the process (step S302). When the destination of the host vehicle M has been acquired, the directivity adjuster 116 calculates the distance between the current position acquired by the position acquirer 112 and the destination, and determines whether or not the distance from the current position to the destination exceeds the predetermined distance Dt (step S304). When the distance from the current position to the destination exceeds the predetermined distance Dt (that is, the destination is distant from the current position), the directivity adjuster 116 calculates the distance between the current position acquired by the position acquirer 112 and the destination, and increases the directivity of the antenna 20 in the destination direction as the host vehicle M (current position) approaches the destination (step S306). The directivity adjuster 116 decreases the directivity of the antenna 20 when the distance from the current position to the destination is within the predetermined distance Dt (that is, the destination is close to the current position) (step S308).

Conclusion of Embodiment

As described above, the communication system 1 according to the embodiment includes an acquirer (in this example, the destination acquirer 111 and the position acquirer 112) that acquires a destination of the mobile body (in this example, the host vehicle M) and the position of the host vehicle M, and a communicator (in this example, the reception processor 113, the transmission processor 114, the sensitivity adjuster 115, and the directivity adjuster 116) that communicates with a communication device (in this example, the external device) outside the host vehicle M using the antenna 20, in which the sensitivity adjuster 115 increases reception sensitivity of the antenna 20 and increases directivity of the antenna 20 in a direction of the destination as a current position of the host vehicle M acquired by the destination acquirer 111 approaches a destination acquired by the position acquirer 112, thereby improving communication quality between the host vehicle M and the external device. Although a mode for carrying out the present invention has been described above using the embodiment, the present invention is not limited to the embodiment at all, and various modifications and substitutions may be made without departing from the spirit of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A communication system provided in a mobile body and including an acquirer configured to acquire a destination of the mobile body and a position of the mobile body, and a communicator configured to communicate with a communication device outside the mobile body using an antenna,
   wherein the communicator is configured to set a reception sensitivity of the antenna when the position of the mobile body approaches to within a predetermined distance from the destination of the mobile body to be higher than a reception sensitivity of the antenna before the position of the mobile body approaches to within the predetermined distance,
   the destination of the mobile body is set via a navigation device within the mobile body, and
   the communicator acquires information from external devices around the destination by increasing the receiving sensitivity of the antenna when the mobile body approaches within a predetermined distance of the destination, compared to the receiving sensitivity of the antenna before the mobile body approaches within the predetermined distance.

2. The communication system according to claim 1, wherein the communicator is configured to increase the reception sensitivity of the antenna as the position of the mobile body approaches the destination.

3. The communication system according to claim 1, wherein the communicator is configured to increase the reception sensitivity of the antenna as the position of the mobile body approaches the destination before the position of the mobile body approaches to within the predetermined distance from the destination.

4. The communication system according to claim 1, wherein the communicator decreases a directivity of the antenna or is configured to set the antenna to be nondirectional when a distance between the position of the mobile body and the destination is within a predetermined distance.

5. The communication system according to claim 4, wherein the communicator is configured to increase the directivity of the antenna in a direction of the destination when the distance between the position of the mobile body and the destination exceeds the predetermined distance.

6. The communication system according to claim 1, wherein the communicator is configured to not change the reception sensitivity of the antenna when the destination is not acquired by the acquirer.

7. A communications method comprising:
   acquiring, by a computer provided in a mobile body, a destination of the mobile body and a position of the mobile body;
   communicating, by the computer provided in the mobile body, with a communication device outside the mobile body using an antenna; and
   setting, by the computer provided in the mobile body, a reception sensitivity of the antenna when the position of the mobile body approaches to within a predetermined distance from the destination of the mobile body to be higher than a reception sensitivity of the antenna before the position of the mobile body approaches to within the predetermined distance,
   wherein the destination of the mobile body is set via a navigation device within the mobile body, and
   the communications method further comprising
   acquiring information from external devices around the destination by increasing the receiving sensitivity of the antenna when the mobile body approaches within a predetermined distance of the destination, compared to the receiving sensitivity of the antenna before the mobile body approaches within the predetermined distance.

8. A non-transitory storage medium storing a program causing a computer provided in a mobile body to:
   acquire a destination of the mobile body and a position of the mobile body;
   communicate with a communication device outside the mobile body using an antenna; and
   set a reception sensitivity of the antenna when the position of the mobile body approaches to within a predetermined distance from the destination of the mobile body to be higher than a reception sensitivity of the antenna before the position of the mobile body approaches to within the predetermined distance,
   wherein the destination of the mobile body is set via a navigation device within the mobile body, and
   the program further causing the computer to:
   acquire information from external devices around the destination by increasing the receiving sensitivity of the antenna when the mobile body approaches within a predetermined distance of the destination, compared to the receiving sensitivity of the antenna before the mobile body approaches within the predetermined distance.

* * * * *